Jan. 9, 1951          H. G. SEYLER          2,537,429

TRANSPARENCY PROJECTOR WITH ROTATABLE TURRET MAGAZINE

Filed April 13, 1948          3 Sheets-Sheet 1

INVENTOR.
HENRY G. SEYLER,
BY Hazard & Miller
ATTORNEYS.

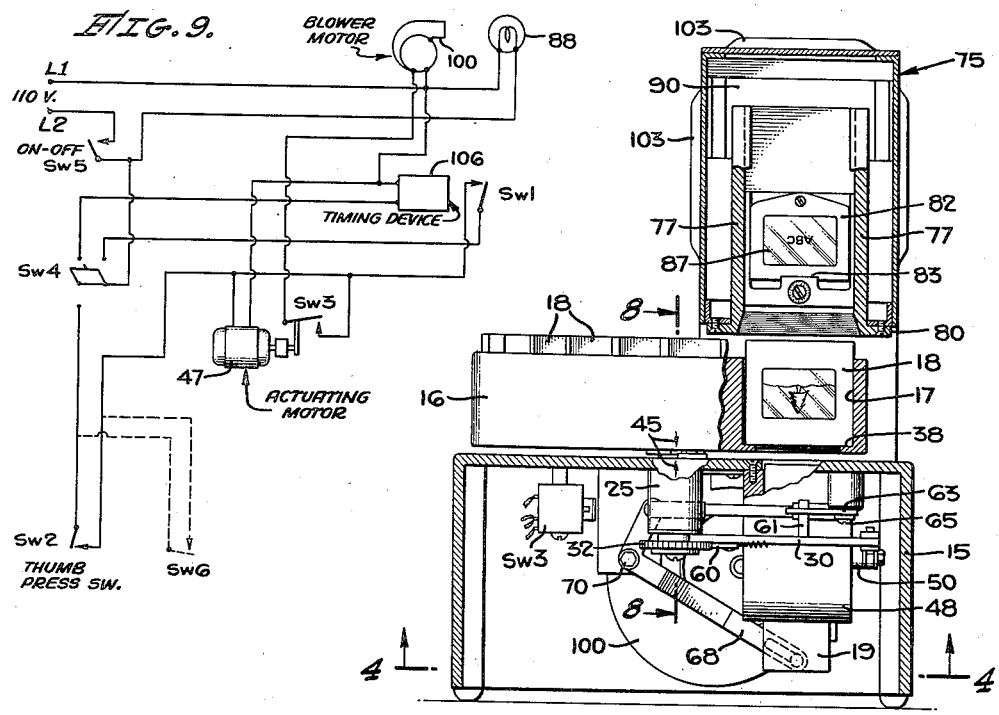

Jan. 9, 1951    H. G. SEYLER    2,537,429
TRANSPARENCY PROJECTOR WITH ROTATABLE TURRET MAGAZINE
Filed April 13, 1948    3 Sheets-Sheet 3
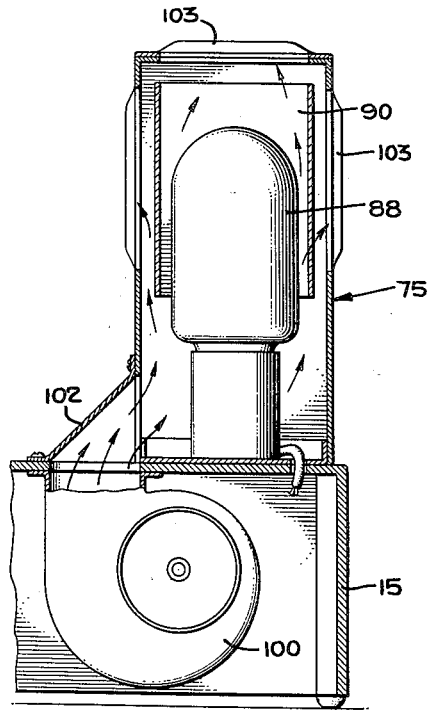
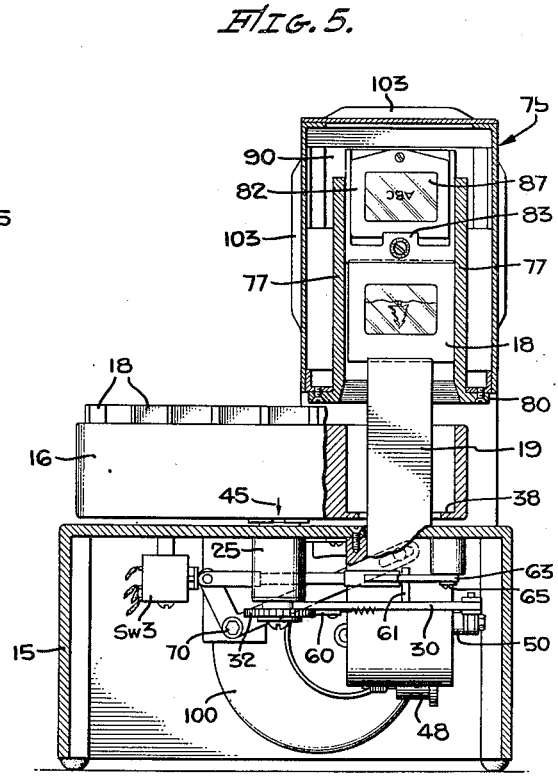
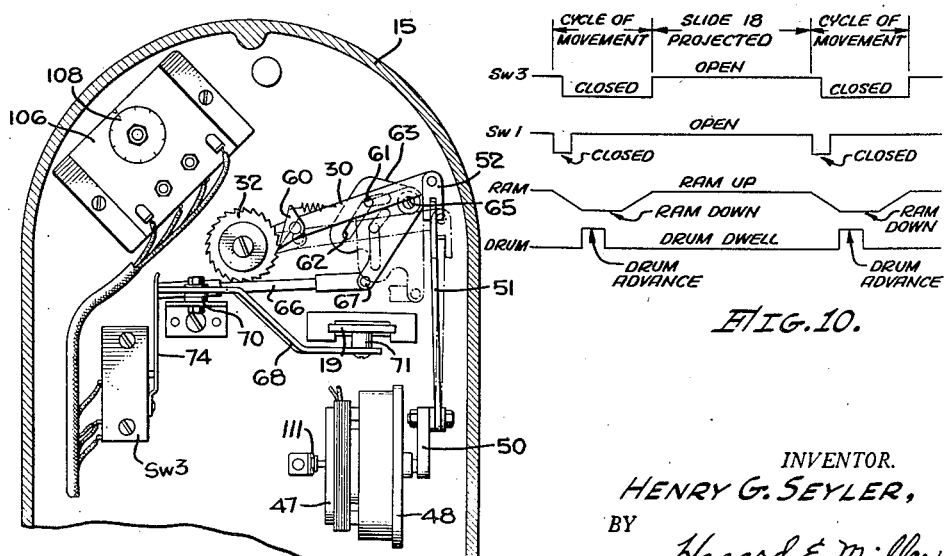
INVENTOR.
HENRY G. SEYLER,
BY
Hazard & Miller
ATTORNEYS.

Patented Jan. 9, 1951

2,537,429

UNITED STATES PATENT OFFICE 2,537,429

TRANSPARENCY PROJECTOR WITH ROTATABLE TURRET MAGAZINE

Henry G. Seyler, Los Angeles, Calif.

Application April 13, 1948, Serial No. 20,707

6 Claims. (Cl. 88—27)

1

This invention relates to a projection apparatus for projecting images from transparencies and particularly to a projection apparatus for automatically projecting a succession of transparencies.

Some subject matter lends itself to be best explained by projection of single transparencies accompanied by verbal information, and other subject matter which is photographed by amateur photographers in single frames must be projected singly. In any event, there has been an increasing use of verbal means for formal education, advertising, explanation, amusement, entertainment, etc. accompanied by explanatory remarks by a lecturer, educator, salesman etc.

Prior projecting machines have usually been of the manual type having the disadvantages well known to those familiar with the projection art. There have also been projecting machines which could automatically project a succession of transparencies. Although the automatic machines were improvement over the manual machines these prior automatic machines have been unsatisfactory in certain ways including the following. In some of the existing automatic projectors, the operator was required to be somewhat expert at inserting slides into the various holders provided and other automatic machines require use of tools in inserting the slides. Other machines were unreliable in that correct focusing of transparencies, that is, correct positioning of transparencies at the objective plane of the optical system, was not consistently obtainable, these machines having rather delicate and complex devices for insuring focusing, which devices easily became out of order. Part of the difficulty in positioning transparencies was due to the fact that the slides carrying the transparencies vary in thickness.

It is a main object of this invention to provide an improved automatic projector so constructed that a series of transparencies may be automatically projected singly and in consecutive order allowing the lecturer to forget the projection apparatus and give his full attention to the subject matter under discussion.

Another main object of this invention is to provide an improved automatic projector having means for correctly positioning transparencies at the objective plane in an optical system in a simple and effective manner which does away with the delicate construction heretofore used.

Another object of this invention is to provide a projecting machine having a simple and effective system for insuring correct and consistent focusing of transparencies which system allows the use of slide containing means having compartments of such dimension that slides may be merely dropped into the compartments and are loosely supported therein whereby the slide containing means can be quickly and easily loaded by any untrained person.

Heretofore, projection machines have been so designed that there was a period between slide changes wherein the screen was either dark or blank, that is, a blank lighted screen. Particularly in advertising it has been found that the audience loses interest in the program because of this period when there was no image on the screen. In other kinds of projecting it is desired to sometimes have a design on the screen during intervals of change, at other times another kind of advertisement, a colored screen, or even a dark screen or a blank lighted screen.

The present invention provides a projection machine so constructed and designed that any of the above situations can be obtained and changes from a design screen to a colored screen or to any of the other types quickly and readily obtained by the provision of a master slide containing an interchangeable plate which plate can be swapped for a transparency of any type or merely be removed entirely.

Another object of the present invention is to provide a master slide as above set out which is so constructed as to urge the transparencies in the slides to be positioned at the objective plane in the optical system of the projector.

It is another object of this invention to provide an apparatus adapted to receive interchangeable slide containing drums or turrets so that the drums or turrets can be filled before the lecture and interchanged freely and quickly.

Another object of this invention is to provide an apparatus having a removable drum adapted to contain a series of transparencies or slides in a definite order so that the drum can be removed and the order of the slides maintained whereby other drums can be inserted in the projector or the same drum inserted in the projector at a later time without any previous requirement for handling and sorting of the slides.

Another object of the present invention is to provide an automatic projection apparatus so constructed that it can be synchronized with reproducing machines.

Another object of this invention is to provide an apparatus having a hand switch so connected in the apparatus that the apparatus projects slides at the convenience of the lecturer at the mere closing of the contacts of the hand switch.

Also objects of the invention are the following: to provide a slide-receiving drum having numbering thereon so that the slides or transparencies may be inserted into the drum into a particular order and having aligning marks on the drum so that when the drum is placed in the machine and the aligning marks aligned the first slide in the sequence will properly be the first slide to be projected; to provide a projection apparatus having a removable drum, said drum having aligning means adapted to cooperate with other aligning means on the apparatus so that the drum is automatically aligned with the other moving parts of the apparatus when placed on the apparatus.

With the foregoing and other objects in view, which will be made manifest in the following detailed description and specifically pointed out in the appended claims, reference is had to the accompanying drawings for an illustrative embodiment of the invention, wherein:

Fig. 1 discloses a plan view of the projection apparatus embodying the present invention and the parts of the device cut away to show the optical system;

Fig. 3 is a sectional view along lines 3—3 of Fig. 2 with parts thereof broken away to better show the construction of the device;

Fig. 4 is a partial sectional view along lines 4—4 of Fig. 3;

Fig. 5 is a sectional view similar to Fig. 3 showing the device in a different operative position with a transparency in position to be projected;

Fig. 6 is a partial sectional view similar to Fig. 4 but showing the mechanism in a different position than shown in Fig. 4;

Fig. 7 is a partial sectional view along lines 7—7 of Fig. 2 showing the blower and light source of the apparatus;

Fig. 8 is an enlarged partial sectional view along lines 8—8 of Fig. 3 showing the manner of mounting the drum or turret;

Fig. 9 is a schematic electrical wiring diagram of the apparatus; and

Figure 1:
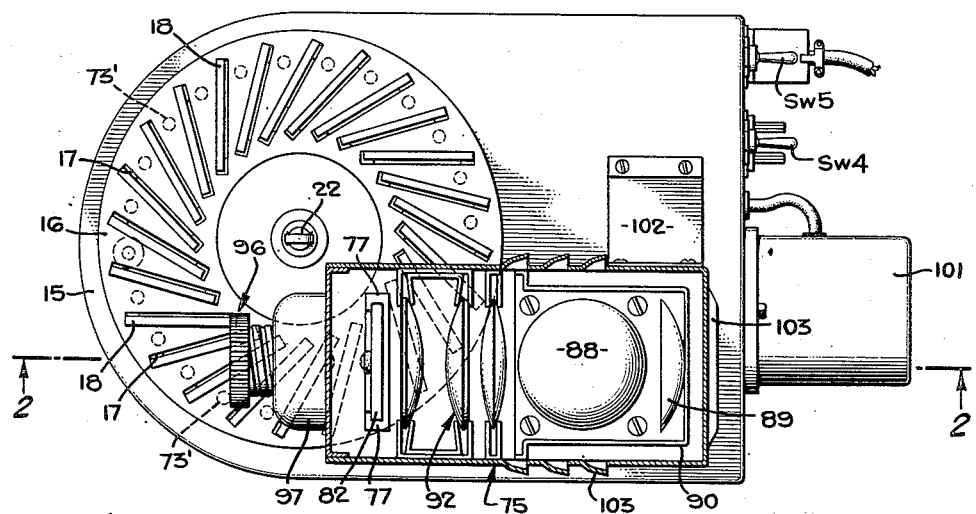

Fig. 10 discloses a time diagram showing the sequence of events.

The present invention can be most easily understood by giving a brief explanation of the operation of the device. Referring to the accompanying drawings wherein similar reference characters designate similar parts throughout, the apparatus comprises a base 15, see Figs. 1 and 2, having a drum or turret 16 rotatably mounted thereon, said drum having pockets 17 adapted to contain slides or transparencies 18. Means are provided in the apparatus for intermittently advancing the drum or turret 16 in a rotational direction so that pockets 17 pass over a vertically reciprocating ram 19 mounted on base 15, said advancing means providing a dwell period for the drum wherein a pocket is positioned over the ram and an advancing period in which the drum is advanced and the next succeeding pocket is brought into vertical alignment with the ram, said ram being so synchronized with the drum that during the dwell period the ram is caused to move upwardly into the pocket and lift a slide 18 out of the pocket and correctly position the slide within an optical projection system, and then after a predetermined period of time moved downwardly depositing the slide back in the pocket and moved out of the drum at which time the dwell period ends and the advancing period begins, the drum advancing so that the next succeeding pocket is aligned with the ram whereupon the next dwell period begins and the ram once again is caused to move upwardly to lift the slide into the optical system and then, after a predetermined period of time, moved downwardly and deposit the slide in the pocket and move out of the drum, at which time the dwell period ends and another advancing period begins and the operation continues.

The specific description of the apparatus embodying the present invention is as follows. The apparatus comprises a base generally entitled 15 on which a drum or turret 16 is rotatably mounted as can be seen by reference to Fig. 8 by means of hollow flanged shaft 21 upon which said turret is mounted by means of a thumb screw 22 which threads into shaft 21. Hollow shaft 21 is mounted on base 15 by means of a bearing 23 and a bushing 24 which fits in a boss 25 formed on base 15. An oscillating link 30 having an aperture adjacent the end thereof is pivoted on hollow shaft 21 against a shoulder 31 and a ratchet wheel 32 is keyed on hollow shaft 21 next to link 30 and kept on the shaft by means of a nut 33 and washer 34. The ratchet wheel 32 and oscillating link 30 form part of the means for advancing turret or drum 16 as will be described hereinafter.

It is necessary that the position of the ratchet wheel 32 with respect to the pockets 17 be maintained in a definite relationship for reasons to be explained and this is accomplished by providing a key 35 on the lower surface of drum or turret 16, as shown in Fig. 8, said key fitting within a key slot 36 provided within the flange on the hollow shaft 21. Therefore since the ratchet wheel 32 is also keyed to the hollow shaft 21 the pockets 17 are in effect keyed to the ratchet wheel 32.

Figure 2:
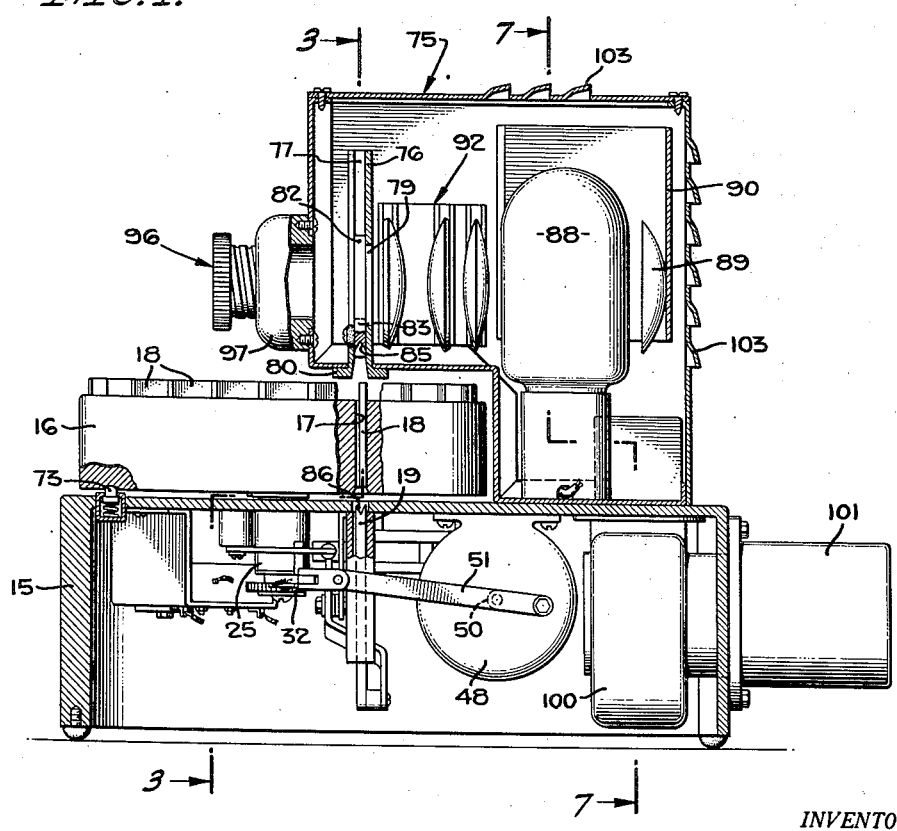
Fig. 2 is a view along lines 2—2 of Fig. 1 showing a side elevation view in section of the projection apparatus showing the optical system and the turret or drum with parts thereof broken away to show its construction.

Drum 16 may have pockets provided therein in any suitable manner, a preferred manner being shown in Figs. 1 and 2 wherein the drum has a hollowed centered portion and a series of slanted slots forming pockets in the raised outer portion of the drum 16, there being shoulders 38 on which slides 18 rest. The angularity of these pockets is such as to cooperate with the particular projector disclosed in this application but the slots may be radial instead of slanted and another shape of projector used. The pockets 17 are designed to be wide enough to accommodate practically any thickness of slide normally used in a projector and the slides may be merely dropped into the pockets, no special manipulation being required, the only precaution being to make sure that the slides are inverted since the image is afterwards inverted by the objective lens.

Throughout specification, the words slide and transparency may be used somewhat interchangeably, however, technically the slide includes the frame and the transparency, the transparency being the piece of film. Of course, it is the transparency that is positioned at the objective plane in the optical system, the slide frame serving to support the transparency.

It is preferred that the pockets 17 be numbered starting with the numeral "1" around the drum in consecutive order, this construction enabling a series of slides 18 to be placed in the drum or turret 16 in a definite order and projected on a screen in a definite order and the order maintained when the drum is removed and another drum applied. Markings, which may take the form of arrows 45, see Fig. 3, are provided on the drum and the outside of base 15 so that whenever it is desired to remove the drum, the apparatus is operated until the ram 19 is withdrawn from the drum whereupon the drum is freely rotated and may be rotated to the point where the two arrows 45 are in line, the placement of the arrows being such that when they are aligned the drum is removed in a direction away from the objective system and its housing, see Fig. 1. These arrows are also so placed that whenever they are aligned, the number "1" pocket is aligned with the ram 19 whereby when the machine is energized the first slide to be projected will be the number "1" slide so that it is easy for a person to insert slides 18 into the pockets of the turret 16 in a definite order and then to begin the projection of the slides by projecting the number "1" slide. The arrows 45 also enable easy application of a drum whenever it is desired to do so since the operator in such case would merely find the arrow on the drum and then insert the drum on the hollow shaft 21 where the key 35 would immediately fall into the key slot 36 whereupon the thumb screw 22 could be inserted and the device ready for use.

There are several different ways in which the ram 19 can be moved and the drum 16 indexed, and a preferred means is disclosed but is not intended to limit this invention. Drum 16 and ram 19 are both operated by a motor 47 which has a reduction unit 48 preferably therein, which unit and motor are fastened to the bottom of base 15 by any suitable means.

Motor 47 drives drum 16 and ram 19 by means of a crank 50 pivoted to a connecting rod 51, said connecting rod being pivoted to a clevis 52, the clevis being pivoted to the oscillating link 30 which is mounted on hollow shaft 21 as previously described. Both the drum 16 and the ram 19 are driven from oscillating link 30, the drum by means of a spring constrained ratchet 60 and ram 19 by means of a stud shaft 61 which rides within an angular slot 62 provided in a cam plate 63 which is pivoted to base 15 at 65. Cam plate 63 is also pivoted to a push rod 66 at 67, said push rod having its other end pivoted to a bell crank 68, compare Figs. 3 and 6, said bell crank being pivoted to base 15 by means of a pivot 70 and to the reciprocating ram 19 by means of a stud shaft 71. When the cam plate 63 is in the position shown in Fig. 6 the reciprocating ram 19 is in its uppermost position, that is, the position in which a transparency is being projected, and when ram 19 is in the position shown in Fig. 4 it is in its downmost position at which time the drum is advancing.

It is preferred that means be provided to exactly set the drum and these comprise a spring pressed detent 73 provided in base 15, see Fig. 2, said detent adapted to cooperate with a plurality of indentations 73', see Fig. 1, provided in drum 16, said indentations being positioned with respect to pockets 17 so that whenever the detent 73 enters one of the indentations 73', a pocket 17 is aligned with the reciprocating ram 19.

The ratchet 60, detent 73 and indentations 73' are so constructed and arranged and positioned that when the ram is in its uppermost position, that is, during projection of a transparency, the ratchet 60 has a space between it and the nearest engageable tooth on the ratchet wheel 32 so that there is a lost motion on movement of the link 30 between the ratchet 60 and the ratchet wheel 32. Therefore, upon the first initial movement of the link 30, stud shaft 61 will move from the full line position shown in Fig. 6 to the dot dash line position shown in Fig. 6 and the ratchet 60 will move from the full line position shown in Fig. 6 to the dot dash line position in Fig. 6 and the ratchet wheel 32 will remain stationary, but it will be noted that during this time the cam plate 63 has been moved down to that position wherein ram 19 is completely withdrawn from drum 16, this occurring before the drum 16 is rotated. Upon further movement of the stud shaft 61 along the other leg of slot 62 the ratchet 60 contacts the ratchet wheel 32 and advances the drum 16, but no further movement of the ram occurs until the stud shaft 61 moves backwardly from the position shown in Fig. 4 to the dot dash position shown in Fig. 6 whereupon the drum 16 is stationary and the ram 19 is now moved upwardly lifting a slide 18 into the projection system.

A motor cut off microswitch $Sw3$ is fastened to the underside of the base and so positioned and arranged that its depressing lever 74 is in such relation with respect to the push rod 66 that when said push rod is in the position shown in Fig. 6 that the contacts of the microswitch are open and when the push rod is in the position shown in Fig. 4 the contacts from the microswitch will be closed.

When the ram 19 is caused to move upwardly into a pocket 17, a slide 18 is lifted from the pocket and moved upwardly into an optical system housing 75 which housing supports the optical system of the apparatus. Housing 75 has a substantially right angle shape in side elevation, as shown in Fig. 2, so that it overhangs the drum or turret 16.

A slide-guide frame 76 is mounted in the overhung portion of the housing 75 and provides an image aperture 79 and side guide channels 77 which are preferably spaced from one another a distance slightly greater than the width of the slides 18, as can be seen in Fig. 5. The legs of each channel 77 are spaced apart a distance greater than the thickness of the slides 18, the slides being aligned by other means to be described. The slide-guide frame has outwardly tapering lips 80 at the bottom portions thereof, see Figs. 2 and 3, so that whenever a slide is lifted by ram 19, the lips will guide the slide into a more nearly vertical position.

A master slide 82 is provided in the projection apparatus and serves three purposes, one to contain a transparency, the image of which is projected during the changing of slides 18, secondly, to hold each slide 18 during its movement, and thirdly, to cooperate with ram 19 to correctly align the transparencies in each slide 18 so that the transparencies are accurately positioned in the objective plane in the optical system. Master slide 82 neatly fits between guide channel 77 with a sliding fit and master slide 82 is of such thickness as to have a slide fit in each guide channel, and has a protruding member 83 so that the master slide is positioned, as shown in Fig. 2, when in its lowermost position.

Master slide 82 has a removable transparency 87, the image of which may be an advertisement, a design, or the transparency may be colored one color or various colors, or the transparency replaced with an opaque plate, or may be completely removed so as to provide a blank lighted screen between changes of slide 18. So it can be seen that any desired screen can be easily provided during intervals of slide change.

In order to insure that slides 18 will be properly centered in the optical system, master slide 82 has a V-groove 85 therein, and ram 19 has a matching V-groove 86 for aligning slides 18 and master slide 82 is preferably heavy enough so that a slide 18 is properly held down on ram 19.

As a slide 18 is lifted by ram 19 from a pocket in which it loosely fits, the tapering of lips 80 will straighten the slide to permit the V-groove 85 in master slide 82 to accept the upper edge of slide 18. Upon further upward movement the slide moves along the internal sides of the V-groove 85 until the front and back edges of the top edge of the slide are resting on the front and back sides of the V-groove respectively near the vertex of the groove, at which time both the slide and the master slide are moved upwardly by the ram 19 until centered in the aperture 79, the V-grooves 85 and 86 serving to correctly position the transparency in slide 18 in the objective plane of the optical system. It will be seen, then, that the two V-grooves are the sole means for holding a slide while the image therein is being projected.

A light source 88 is provided in the system and there is a concave mirror 89 mounted on a C-shaped shield 90 which in turn is mounted on housing 75, said concave mirror serving to reflect light issuing from lamp 88 and direct it toward the objective lens. A condensing system generally entitled 92 is provided for condensing the light issuing from lamp 88 and to direct the light through the aperture 79 and through any slide which is positioned therein and through the objective lens, not shown, which is mounted in a member 96. Member 96 is of the usual type for containing an objective lens and is threaded so as to fit a spring press detent in a supporting member 97 as is common practice to allow adjustment of the objective lens so that an image may be focused on a screen.

Means are provided for cooling the apparatus and comprise a blower 100 which is preferably mounted within the base 15, said blower being driven by a motor 101 which may be mounted on the outside of frame 15, said blower directing air in an upward direction through a conduit from plate 102 into the housing 75 and along the lamp 88 and out through louvers 103.

Means for advancing and timing the various parts of the apparatus will now be described particularly in connection with the circuit diagram shown in Fig. 9 and the time diagram shown in Fig. 10. The diagram has been exaggerated to show the sequence of events as contrasted to the times in which the various events take place. For instance, switch Sw3 is closed by push rod 66 almost immediately on movement of the ram but the time diagram shows a noticeable delay, if the space is taken as a measurement of the time, but as before explained the spaces are not intended to represent a measurement but only intended to represent the sequence of events. The advancing means includes a timing device 106 which has a microswitch Sw1, said timer being of common construction and when energized from a source of current serves to close switch Sw1 at intervals of time so as to give out pulses of energy at the different intervals. The intervals at which the pulses are given out (but not the length of pulse time) can be set by a dial 108 on the device. The timing device 106 in the present invention is used to begin the cycle of movement (the cycle of movement refers to the time which motor 47 is energized and referred to on diagram 10 only as the cycle of movement), but the apparatus is constructed so that motor 47 turns itself off by means of motor cut-off switch Sw3 thereby ending the cycle, this construction always insuring that the various mechanical parts of the apparatus will be in the same position at the beginning of each cycle and reliance not placed on the pulse period—period of time which the timer 106 holds switch Sw1 closed—so that whatever inaccuracies are inherent in the timing device they will have no effect on the operation of the apparatus of the present invention.

The dwell period and advance period previously referred to refer to the dwell period of the drum 16 or advance period of the drum 16; the advance period of the drum being only a part of the cycle of movement as can be seen from Fig. 10.

The timing device 106 and switch Sw1 may be cut out of the circuit, shown in Fig. 9, by means of a double-throw double-pole switch Sw4 which is provided so that the device may be operated by the hand control thumb press switch Sw2, switch Sw4 being constructed so that it will always be in a position so as to put either timing device 106 and switch Sw1 in the circuit or the thumb press switch Sw2 in the circuit. Whatever position switch Sw4 is in, blower motor 100 and lamp 88 will be energized when the off-on switch Sw5 is thrown to "on" position since the blower motor and lamp are directly across lines L1 and L2.

Switch Sw3 and Sw1 are arranged to be in open position when ram 19 is in its uppermost position and when the ram is in its uppermost position a slide is in position to be projected.

The operation of the device is as follows. Assuming switch Sw4 is thrown to fully automatic position so as to cut timing device 106 and switch Sw1 into the circuit. The off-on switch Sw5 may be thrown to "on" position at which time the blower motor 100, lamp 88 and timing device 106 are immediately energized. Referring to Fig. 10, if the timing device is in one of its dead periods, that is, in one of the periods in which switch Sw1 is open, ram 19 will be in its uppermost position and a slide 18 will be projected and the various mechanical parts will be in the position depicted diagrammatically at the extreme left hand of Fig. 10. At the first live period, that is, the first period in which the timing device closes switch Sw1, motor 47 will be energized rotating crank 50, moving master link 30 and push rod 66 so that the reciprocating ram 19 is withdrawn from the drum. The device is so constructed and arranged that upon the first movement of push rod 66, switch Sw3 will be closed so that the motor is energized through either switch Sw1 or Sw3. Shortly thereafter, switch Sw1 is open, see Fig. 10, by the timing device and the motor 47 is now energized through switch Sw3. As previously explained, lost motion between the ratchet and the ratchet wheel 32 is such that the reciprocating ram is completely withdraw before the ratchet engages the ratchet wheel to move the drum as can be appreciated by reference to Fig. 10. As the motor continues its movement the drum or turret 16 is rotated around and the detent 73 engages an indentation 73' at which time the crank 50 has rotated to the position shown in Fig. 4 and begins its reverse movement so that the ratchet 60 retreats from the ratchet wheel 32, the stud shaft 61 moving back along the angular slot in cam plate 63 and ram 19 is raised. The system is so arranged that the push rod 66 opens switch Sw3 at a point where ram 19 is at its uppermost position—in position where a slide can be projected. It is preferred that some sort of damping device be provided for the motor 47 so that the inertia of the motor, reduction unit and mechanical linkages will not overrun and in the present device the dampening device comprises a friction brake 111 which bears against the end of the rotor shaft of the motor. It is obvious that any type of damping device could be used and the invention is not limited to a mechanical dampening device.

When it is desirable to use the thumb press switch Sw2, switch Sw4 is thrown to its other position, that is hand control position, whereupon the timing device 106 and switch Sw1 are thrown out of the circuit. Under these circumstances, if the off-on switch Sw5 is thrown to "on" position, the blower motor 109 and lamp 88 are energized but motor 47 will not be energized until switch Sw2 is closed. Switch Sw2 is preferably of the click type so that only a brief energization results when the operator presses the switch from one extreme position to the other, this brief energization serving to move the push rod 66 to close switch Sw3 so that motor 47 is now energized by switch Sw3 and will deenergize itself as soon as push rod 66 is moved back up to open switch Sw3.

It will be appreciated that the above described embodiment of the invention provides an apparatus whereby slides may be automatically projected without any controlling by the operator or may be automatically projected under hand control by the operator. In either event, the operator can give his full attention to the subject under discussion which the slides refer to.

An auxiliary switch, Sw6, may be provided and is shown in Fig. 9 in dot-dash lines, for use with auxiliary equipment, wherein the auxiliary equipment would operate the auxiliary switch, Sw6, to operate the projector in timed relation therewith; for instance, to illustrate a recorded lecture.

Various changes may be made in the details of construction without departing from the spirit and scope of the invention as defined by the appended claims.

I claim:

1. In a transparency projector, an optical system for projecting images of transparencies, a turret having a plurality of pockets therein adapted to hold a series of transparencies, push means for moving transparencies from said pockets into said optical system for projection purposes, means for intermittently rotating said turret in synchronous relation to the movement of said push means to bring successive pockets in said turret into registration with said push means, said last mentioned means including a pivotally mounted oscillating link, a ratchet on said link, a ratchet wheel arranged to be engaged by said ratchet and intermittently rotate said turret in response to oscillation of said link, a bell crank swingably mounted adjacent said link, said bell crank having one arm thereof operably connected to said push member to reciprocate the same in response to oscillation of said bell crank, and the other arm of said bell crank being operably connected to said link so that said bell crank is oscillated in response to oscillation of said link.

2. In a transparency projector, an optical system for projecting images of transparencies, a turret having a plurality of compartments therein adapted to hold a series of transparencies, push means for moving the transparencies from said compartments into said optical system for projection purposes, means for intermittently reciprocating the push means and intermittently rotating said turret in synchronous relation to the movement of the push means to bring successive compartments of the turret into registration with the push means, said last named means including a member mounted for oscillating movement, means connecting the member and the turret for intermittently rotating the turret in response to oscillation of said member, a cam plate mounted for oscillating movement, a cam rider supported by the member and engaging the plate for oscillating the plate in response to oscillation of the member, and means connecting the plate to the push means for reciprocating the push means in response to oscillation of the cam plate.

3. In a transparency projector, an optical system for projecting images of transparencies, a turret having a plurality of compartments therein adapted to hold a series of transparencies, push means for moving the transparencies from said compartments into said optical system for projection purposes, means for intermittently reciprocating the push means and intermittently rotating said turret in synchronous relation to the movement of the push means to bring successive compartments of the turret into registration with the push means, said last named means including a bell crank mounted for oscillating movement and having one arm operatively connected to the push means for reciprocating the push means when oscillated, a member pivotally mounted for oscillating movement operatively connected to the bell crank for oscillating the bell crank when oscillated, a second member pivotally mounted for oscillating movement, a cam on the first named member, a cam rider on said second named member for oscillating the first named member in response to oscillation of said second member, and motor means for oscillating said second member, said second member being operatively connected to the turret to intermittently rotate the turret when said second member is oscillated.

4. In a transparency projector, an optical system for projecting images of transparencies, a turret having a plurality of compartments therein adapted to hold a series of transparencies, push means for moving the transparencies from said compartments into said optical system for projection purposes, means for intermittently reciprocating the push means and intermittently rotating said turret in synchronous relation to the movement of the push means to bring successive compartments of the turret into registration with the push means, said last named means including a member mounted for oscillating movement, a second member mounted for oscillating movement, means operatively connecting said members to oscillate the second member in response to oscillation of the first member, means operatively connecting the first named member and the turret for intermittently rotating said turret in response to oscillation of said first named member, a bell crank pivotally mounted for oscillating movement and operatively connected to the push means for reciprocating the push means when oscillated, and means operatively connecting said second member and the bell crank for intermittently oscillating the bell crank in response to oscillation of said second member synchronously with movement of the turret.

5. In a transparency projector, an optical system for projecting images of transparencies, a transparency carrier movable beneath the optical system and adapted to loosely receive a plurality of transparencies, a ram arranged beneath the carrier, means for raising the ram to cause the ram to pass into the carrier and engage a transparency and raise the transparency into the optical system, the ram having a transparency centering V-groove on the upper end thereof, the distance across the V-groove being greater than the thickness of any of the lower engaged edges of the transparencies permitting the ram to successively engage and center lower portions of transparencies disposed in different positions in the carrier, a movable transparency guiding member adapted to be engaged by the upper edge of a transparency and be raised thereby, and means for guiding the movable transparency guiding member for vertical movements in alignment with the ram, the movable transparency guiding member having a V-groove on the lower end thereof, the distance across the V-groove being greater than the thickness of any of the upper engaged edges of the transparencies permitting the movable transparency guiding member to successively engage and center the upper portions of transparencies disposed in different positions with respect to the movable transparency guiding member.

6. In a transparency projector, an optical system for projecting images of transparencies, a transparency carrier movable beneath the optical system and adapted to loosely receive a plurality of transparencies, a ram arranged beneath the carrier, means for raising the ram to cause the ram to pass into the carrier and engage a transparency and raise the transparency into the optical system, the ram having a transparency centering V-groove on the upper end thereof, the distance across the V-groove being greater than the thickness of any of the lower engaged edges of the transparencies permitting the ram to successively engage and center lower portions of transparencies disposed in different positions in the carrier, a movable transparency guiding member adapted to be engaged by the upper edge of a transparency and be raised thereby, and means for guiding the movable transparency guiding member for vertical movements in alignment with the ram, the movable transparency guiding member having a V-groove on the lower end thereof, the distance across the V-groove being greater than the thickness of any of the upper engaged edges of the transparencies permitting the movable transparency guiding member to successively engage and center the upper portions of transparencies disposed in different positions with respect to the movable transparency guiding member, and a wide-mouthed guide between the carrier and the movable transparency guiding member for receiving and guiding the upper edges of transparencies toward the V-groove in the movable transparency guiding member as the transparencies are raised by the ram.

HENRY G. SEYLER.

REFERENCES CITED

The following references are of record in the file of this patent:

UNITED STATES PATENTS

| Number | Name | Date |
| --- | --- | --- |
| 24,327 | Perry | June 7, 1859 |
| 594,819 | Allen | Nov. 30, 1897 |
| 1,069,521 | Bernard | Aug. 5, 1913 |
| 1,108,935 | Schwanhausser | Sept. 1, 1914 |
| 1,354,682 | Petherick | Oct. 5, 1920 |
| 1,371,871 | Dietz | Mar. 15, 1921 |
| 1,950,047 | Contal | Mar. 6, 1934 |
| 2,076,924 | Spindler | Apr. 13, 1937 |
| 2,146,452 | Spindler | Feb. 7, 1939 |
| 2,298,413 | Reid | Oct. 13, 1942 |
| 2,373,392 | Griswold | Apr. 10, 1945 |

FOREIGN PATENTS

| Number | Country | Date |
| --- | --- | --- |
| 580,663 | France | Sept. 5, 1924 |
| 240,673 | Great Britain | Oct. 8, 1925 |
| 215,992 | Switzerland | Nov. 1, 1941 |